US008856922B2

(12) United States Patent
Rubinstein et al.

(10) Patent No.: US 8,856,922 B2
(45) Date of Patent: Oct. 7, 2014

(54) IMPOSTER ACCOUNT REPORT MANAGEMENT IN A SOCIAL NETWORKING SYSTEM

(75) Inventors: Yigal Dan Rubinstein, Los Altos, CA (US); Mitu Singh, San Carlos, CA (US)

(73) Assignee: Facebook, Inc., Menlo Park, CA (US)

( * ) Notice: Subject to any disclaimer, the term of this patent is extended or adjusted under 35 U.S.C. 154(b) by 182 days.

(21) Appl. No.: 13/307,905

(22) Filed: Nov. 30, 2011

(65) Prior Publication Data
US 2013/0139236 A1    May 30, 2013

(51) Int. Cl.
| G06F 11/00 | (2006.01) |
| G06F 12/14 | (2006.01) |
| G06F 12/16 | (2006.01) |
| G08B 23/00 | (2006.01) |
| H04L 29/06 | (2006.01) |

(52) U.S. Cl.
CPC .................................. *H04L 63/1483* (2013.01)
USPC ............................................... 726/22; 726/25

(58) Field of Classification Search
CPC .............. H04L 63/1433; G06F 21/552; G06F 2221/2133; H04Q 2213/13515; H04W 12/12
USPC ...................... 726/26, 22–23, 25, 66; 715/200
See application file for complete search history.

(56) References Cited

U.S. PATENT DOCUMENTS

| 7,945,653 B2 | 5/2011 | Zuckerberg |
| 8,171,388 B2 * | 5/2012 | Zaltzman et al. ............. 715/200 |
| 8,200,587 B2 | 6/2012 | Deyo |
| 8,225,413 B1 * | 7/2012 | De et al. ........................... 726/26 |
| 8,484,744 B1 * | 7/2013 | De et al. ........................... 726/26 |
| 8,543,929 B1 | 9/2013 | Holloway |
| 8,572,199 B2 | 10/2013 | Piper et al. |
| 8,572,277 B2 | 10/2013 | Morris et al. |
| 2004/0139014 A1 * | 7/2004 | Song et al. ...................... 705/40 |
| 2004/0203595 A1 * | 10/2004 | Singhal .......................... 455/411 |
| 2005/0171799 A1 | 8/2005 | Hull et al. |
| 2007/0133768 A1 * | 6/2007 | Singh ....................... 379/114.14 |
| 2008/0070697 A1 | 3/2008 | Robinson et al. |
| 2008/0071901 A1 | 3/2008 | Adelman et al. |
| 2008/0086458 A1 | 4/2008 | Robinson et al. |
| 2008/0091723 A1 | 4/2008 | Zuckerberg et al. |
| 2008/0178258 A1 * | 7/2008 | Loomis ............................. 726/2 |
| 2008/0228868 A1 | 9/2008 | Sivakoff |
| 2008/0282324 A1 | 11/2008 | Hoal |
| 2008/0288405 A1 * | 11/2008 | John ............................... 705/44 |
| 2009/0089876 A1 * | 4/2009 | Finamore et al. ............... 726/21 |
| 2009/0094287 A1 | 4/2009 | Johnson et al. |
| 2009/0113040 A1 | 4/2009 | Zalewski |

(Continued)

OTHER PUBLICATIONS

U.S. Appl. No. 61/231,308, filed Aug. 4, 2009, Inventor George Zaloom, three hundred pages.

*Primary Examiner* — Eleni Shiferaw
*Assistant Examiner* — Jing Sims
(74) *Attorney, Agent, or Firm* — Fenwick & West LLP

(57) ABSTRACT

Imposter account reports received by a social networking system are put into a report management process that routes the reports into other handling processes based upon the comparison of the probability of fraud in an alleged imposter account versus the probability of fraud in an alleged authentic account. The account determined to be most probably fraudulent is enrolled in an account verification process. In the account verification process, the account-holder is asked to verify their identity automatically. If the automatic verification fails to verify the identity of the account-holder, a manual process for verification is initiated.

28 Claims, 4 Drawing Sheets

(56) References Cited

U.S. PATENT DOCUMENTS

| | | |
|---|---|---|
| 2009/0132689 A1 | 5/2009 | Zaltzman et al. |
| 2009/0132933 A1 | 5/2009 | Faski |
| 2009/0198566 A1 | 8/2009 | Greenberg |
| 2009/0271283 A1 | 10/2009 | Fosnacht et al. |
| 2009/0288112 A1 | 11/2009 | Kandekar et al. |
| 2010/0030620 A1 | 2/2010 | Wannier et al. |
| 2010/0031148 A1 | 2/2010 | Rivera |
| 2010/0064006 A1 | 3/2010 | Chaintreau et al. |
| 2010/0094728 A1 | 4/2010 | Denning et al. |
| 2010/0146054 A1 | 6/2010 | Armstrong et al. |
| 2010/0174722 A1 | 7/2010 | Carteri |
| 2010/0217721 A1 | 8/2010 | Wormald et al. |
| 2010/0318510 A1 | 12/2010 | Ryu |
| 2011/0035264 A1 | 2/2011 | Zaloom |
| 2011/0276484 A1* | 11/2011 | Pearson et al. .................. 705/44 |
| 2011/0295722 A1* | 12/2011 | Reisman ...................... 705/27.1 |
| 2012/0105440 A1* | 5/2012 | Lieberman et al. ........... 345/419 |
| 2013/0185220 A1 | 7/2013 | Good et al. |

* cited by examiner

IMPOSTER ACCOUNT REPORT MANAGEMENT IN A SOCIAL NETWORKING SYSTEM

BACKGROUND

This invention relates generally to social networking, and in particular to the management of reports related to imposter accounts in a social network system.

Social networking systems allow users to create accounts that are tied to their identities. The users may be individuals or entities such as corporations or charities. An imposter account is one created by a bad actor to impersonate another person or entity, or is an account that inaccurately represents someone other than the person who is using the account. Traditionally social networking systems have handled imposter accounts by allowing users to report imposter accounts as they come across them. Typically a social networking system manages these reports through a review process. The review process must handle the case where an innocent account is accused by a mistaken or malicious user. For example, when a social networking system receives a report from a user that identifies an alleged imposter account, the review process may use a human agent to contact the accused account-holder in order to verify their identity.

Such a manual review process may require significant human resources. In recent years, the volume of reports from users of social networking systems has made the management of these reports an overwhelming task. In addition, the sheer number of reports has tended to degrade the user-experience of social networking systems by subjecting many innocent users to unnecessary and burdensome user-verification procedures when they are mistakenly or maliciously reported.

For these reasons there has been a pressing need for a system that can manage the stream of user reports and reduce the number of false reports that are submitted to the reviewing process.

SUMMARY

A social networking system provides a method for managing an imposter account report received from a reporting user of the system, where the report may indicate an alleged imposter account as well as an alleged authentic account. The method determines a first fraud probability, where the first fraud probability comprises a measure of the probability that the alleged imposter account is fraudulent. The method also determines a second fraud probability, where the second fraud probability comprises a measure of the probability that the alleged authentic account is fraudulent. The method then compares the first fraud probability and the second fraud probability, and when the first fraud probability is greater than the second fraud probability and greater than a minimum fraud probability threshold, the social networking system enrolls the alleged imposter account in an account verification process.

In the event the second fraud probability is greater than the minimum fraud probability, and greater than the first fraud probability, the social networking system may enroll the alleged authentic account in an account verification process. In the event that the first fraud probability is less than the minimum fraud probability, the social networking system may enroll the reporting user in an education process to reduce the incidence of improper imposter account reporting.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
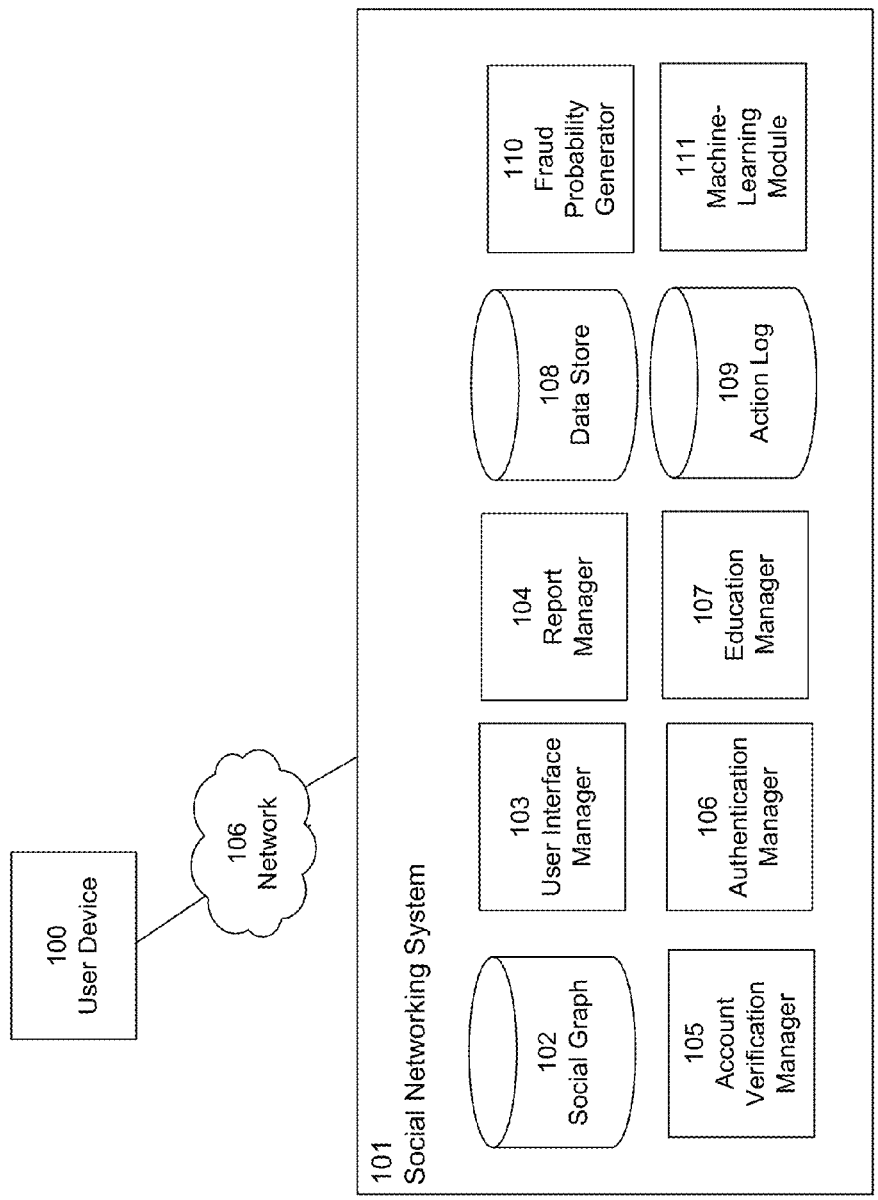
FIG. 1 illustrates a social networking system environment in which one embodiment of the imposter account report management process is implemented.

Overview of the Social Networking System Environment for Imposter Account Report Management FIG. 1 is a high-level block diagram of the social networking system environment in which the imposter report management process operates, according to one embodiment. FIG. 1 shows a single user device 100 communicating with a social networking system 101, over a network 106. Although one user device 100 and one social networking system 101 are illustrated in this figure, in practice there may be many user devices 100 and many social networking systems 101 connected over the network 106.

The social networking system 101 allows users to create accounts and establish links with other users of the social networking system 101. When two users become linked, they are said to be "connections," "friends," "contacts," or "associates" within the context of the social networking system 101. The social networking system 101 includes a social graph 102. The social graph 102 stores the connections that each user has with other users of the social networking system 101.

The social networking system provides a user with various ways to communicate with other users, for example, by email (internal and external to the social networking system), instant message, text message, phone, and the like. The social networking system allows a user to share new content items (such as photographs, videos, and URLs) as well as to view, comment on, download or endorse another user's content items.

The social networking system 101 maintains a user account for each user that has joined the social networking system. The user that has created an account on the social networking system is referred to as the "account-holder" for that account. Any action that a particular user communicates to the social networking system 101 is associated with the user's account, through information maintained in an action log 109. Such actions may include, for example, adding a link to the another user, sending a message to another user, reading a message from another user, viewing content associated with another user, attending an event posted by another user, among others. The action log 109 stores a log of actions of a user and those of other users with whom the user has established a connection in the social networking system (i.e., the user's connections). A log entry for an action may include the time of occurrence of the action, a type of action performed, the user who performed the action, an object on which the action was performed, and any other information related to the action, such as the content of a user's comment or a location associated with the action. For example, in the action 'Adrian bought a ring at Tiffany & Co.,' the type of action is buying, the object is a ring and extra information includes where the ring was bought, Tiffany & Co. The actions may be taken online either within the social networking system 101 or outside of it, or they may be actions performed in the real world and recorded and communicated to the social networking system 101.

The social networking system 101 also maintains a user profile with each account. The user profile describes the account-holder's characteristics such as work experience, educational history, hobbies, location, or similar data, and may also include data describing one or more relationships between the account-holder and other users. Account-holders may also post messages specifically to their profiles in the form of "status updates." Users of a social networking system may view the profiles of other users if they have the permission. In some embodiments, becoming a connection of an account-holder automatically provides the permission to view the account-holder's profile. Each user account on the social networking system typically has a single user profile associated with it.

Although many user accounts are created by individuals for themselves, other user accounts may be created by individuals for organizations such as non-profits or corporations. In such cases, although an officer of the organization may create the account, the account-holder for that account is considered to be the organization rather than the individual officer creating the account.

The user profile associated with an account may reveal the real identity of the account holder. For example, the real name of an individual, celebrity or organization. The social networking system may require that account-holders reveal their real identities, and that they do not impersonate other people or entities through their user profiles. In order to authenticate the identities of account-holders the social networking system may employ various methods, described in more detail herein. When the social networking system receives a report that an account-holder is fraudulently impersonating a person or entity, the social networking system may initiate an imposter account report management process through the report manager 104.

Generally being linked in a social networking system 101 allows linked users access to more information about each other than would otherwise be available to unlinked users.

A user interacts with the social networking system 101 using a user device 100, such as a personal computer or a mobile phone. The user may interact with the social networking system 101 via a web application running in a web browser executing on the user device 100; or the user may interact with the social networking system 101 through a native application running on the user device 100. These applications may be downloaded to the user device 100 from the social networking system 101, or they may be provided by a third party. Typical interactions between the user device 100 and the social networking system 101 include operations such as creating an account, viewing profiles associated with other accounts, contributing and interacting with media items, joining groups, listing and confirming attendance at events, checking in at locations, liking certain pages, creating pages, and performing other tasks that facilitate social interaction. A user connected through a user device 100, to the social networking system 101, may also create a report to complain about another account on the social networking system 100. The social networking system 101 initiates a report management process to deal with such reports, as described in more detail herein.

The network 106 is the Internet or another system of interconnected computer networks that use standard communications technologies and/or protocols to facilitate data transmission. Thus, the network 106 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML) and the extensible markup language (XML). In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

The social networking system 101 includes a user interface manager 103 that allows a social networking system user to interact with the social networking system 101. For example, the user interface manager 103 may generate one or more web pages that are displayed on the user device 100, where the web pages display social networking system data such as images, video, user profiles, etc. The user interface manager 103 also generates the interfaces necessary for the social networking system 101 to request and receive information from the user operating the user device 100. For example, the user interface manager 103 may create a web page form so that a user can provide biographic information, such as the user's age, for use by the social networking system 101 in creating that user's user profile. User information is stored by the social networking system in the data store 108. User information includes not only the biographic information provided by users, but also may include data objects uploaded by a user such as photographs, video, status updates, blog posts etc. When other users request the user's profile page, user interface manager 103 may retrieve the user's data from the data store 108 and generate a user profile web page for display on the user device 100.

The authentication manager 106 authenticates a user on user device 100 as having an account on the social networking system 101. It allows a user to log into the social networking system 101 using any user device 100 that has an application supporting the social networking system 101. In some embodiments, the authentication manager 106 validates users that connect to the social networking system 101 through third party applications.

The report manager 104 controls the process that is used to manage user reports in the social networking system 101. Users may report a variety of different complaints to the social networking system 101, and these reports are passed to the report manager 104 in order to streamline the process of resolving them. The report manager 104 may resolve many reports automatically, and others which it cannot resolve automatically may be forwarded to a human agent to resolve.

If the report manager 104 receives a report from a user that identifies an alleged imposter account, the report manager 104 may use the services of the fraud probability generator 110 to compute a measure of the likelihood that the accused account is an imposter. The fraud probability generator 110 has processes that are able to evaluate the trustworthiness of accounts based on data in the social graph 102, the action log 109, and data store 108 (collectively called the social data). For example, the fraud probability generator 110 may detect that an alleged imposter account that purports to be a certain celebrity has no connections in the social graph 102, and no actions in the action log 109, which may indicate that there is a high probability that the account is fraudulent. The fraud probability generator 110 may utilize the services of the machine-learning module 111 to determine a measure of the probability that a particular account is fraudulent (the "fraud probability"). The machine-learning module 111 trains machine-learned models that can detect fraudulent accounts based on social data.

When the report manager 104 detects that there is a high probability that a reported account is an imposter (i.e. the fraud probability measure is high), the report manager 104 may enroll the alleged imposter account in an account verification process managed by the account verification manager 105. The account verification manager 105 can verify the identity of the account-holder of the alleged imposter account using methods like credit card verification and telephone verification. The account verification manager may also escalate the verification task to a human agent if automated methods are not adequate.

When the report manager 104 detects that a report is inaccurate—e.g. when a reported account is verified to be authentic by the account verification manager 105—it may enroll the reporting user in an education process designed to reduce the incidence of improper imposter account reports. The education process for the reporting user is managed by the education manager 107.

Imposter Account Report Management

The imposter account report management begins when a social networking system user, called the reporting user, reports an account, called the alleged imposter account, to the social networking system 101. The reporting user may be motivated to report the alleged imposter account (I) because that account is in fact an imposter, or the reporting user may be motivated to report the account for an illegitimate reasons, such as maliciousness or mistaken belief. The reporting user may also (but not necessarily) also identify an alleged authentic account (A). The alleged authentic account is the account that the reporting user believes is controlled by the actual user or entity as whom the alleged imposter account is masquerading. In some instances a malicious reporting user may report a genuine user's account as an imposter and may identify some imposter account to the social networking system 101 as the authentic account. In embodiments of the invention, the social networking system 101 distinguishes between the legitimate reports and the illegitimate reports with the help of the report manager 104.

Figure 2A:
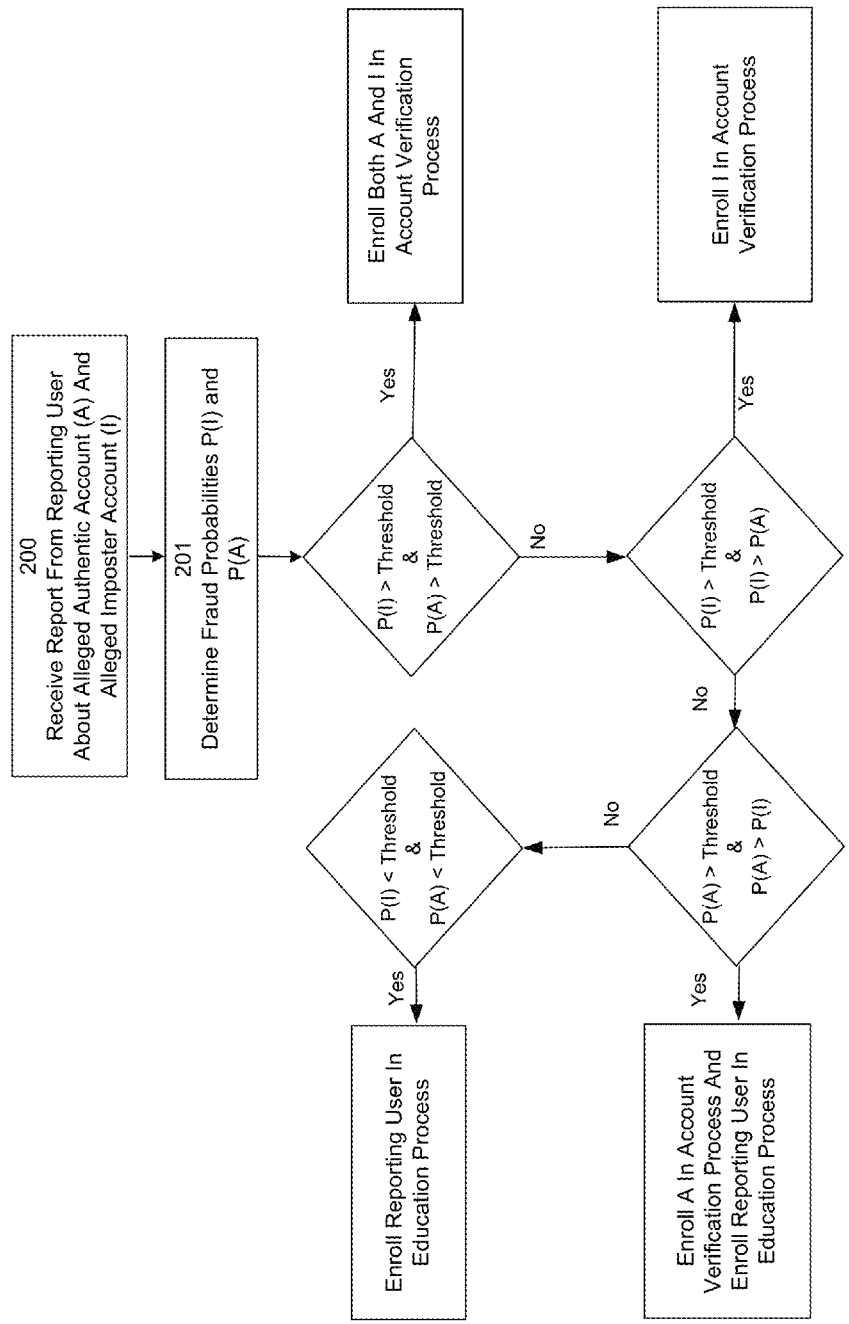
FIG. 2A is a flowchart illustrating one embodiment of an imposter account report management process.

FIG. 2A illustrates one embodiment of the imposter account report management process in the report manager 104. The report manager 104 manages the process of determining the authentic accounts from the imposter accounts, in an environment where some reporting users may be malicious or mistaken.

The report manager 104 receives 200 a report from the reporting user of the social networking system 101. The report designates an alleged imposter account and may also designate an alleged authentic account. The report manager 104 then utilizes the services of the fraud probability generator 110 to determine 201 fraud probabilities for the alleged imposter account and the alleged authentic account. The fraud probability of an account is a measure of the probability that that account is an imposter. The fraud probability for the alleged imposter account is designated P(I) and the fraud probability for the alleged authentic account—assuming one was identified in the report—is designated P(A).

In one embodiment P(I) and P(A) are generated by the fraud probability generator 110 using machine-learned algorithms that use the social graph 102 and the data in the data store 108 and action log 109 to determine the probability that an account is fraudulent. The machine-learned algorithms may be trained by the machine-learning module 111. The machine-learned algorithms are trained to recognize the characteristics of an account that are correlated with being an imposter based on one or more data signals available to the system. For example, an account with low activity (i.e., few actions in the action log 109), and only a few connections in the social graph 102 may be determined to have a high probability of being fraudulent. In contrast, an account with many connections in the social graph 102, with many actions in the action log 109, and many data objects in the data store 108 may be determined to have a low probability of being fraudulent. The machine-learning module 111 may provide different machine-learned algorithms to calculate P(I) and P(A) based on the characteristics of I and A. For example, different machine-learned algorithms may be selected to generate P(I) and P(A) based on the demographic information, such as age, of I and A. In another example, a different machine-learned algorithm may be used when I and A are corporations as opposed to people.

Once P(I) and P(A) are determined, the report manager 104 compares these fraud probabilities against a minimum fraud probability threshold. The minimum fraud probability threshold is a value that is set by the social networking system 101, and which is a measure of the minimum probability of fraud that must exist before the report manager 104 initiates an account verification process. Since the account verification process may be burdensome to an account-holder, the social networking system 101 may set this minimum threshold to avoid burdening users that have only a low probability of being frauds. The minimum fraud probability threshold may be set by the social networking system 101 based on a global policy, or the threshold may be set based on other factors assessed by the social networking system 101, such as demographics of I and A, celebrity status of I and A, demographics of the reporting user, etc.

If both P(I) and P(A) are above the minimum fraud probability threshold, then both A and I may be enrolled in an account verification process by the report manager 104. The account verification process is managed by the account verification manager 105 and is described in more detail herein. If only P(I) is greater than the threshold, and P(I) is greater than P(A), then only I is enrolled in an account verification process. If only P(A) is greater than the threshold, and P(A) is greater than P(I), then only A is enrolled in an account verification process. In this situation the report manager 104 has determined that the alleged imposter account is more likely to be authentic than the alleged authentic account. This may indicate that the reporting user has either acted in bad faith or is mistaken. To deal with this, the report manager 104 may enroll the reporting user in an education process. The education process is managed by the education manager 107, and is described in more detail herein. If neither P(A) nor P(I) are above the minimum fraud probability threshold, then neither account is enrolled in the account verification process, and the reporting user is enrolled in the education process.

If the reporting user does not indicate an alleged authentic account in the imposter account report sent to the social networking system 101, then the process described above may be modified. In such a case, the fraud probability generator 110 will generate only one fraud probability, P(I), for the alleged imposter account. There will be no P(A) generated since no authentic account has been identified. In this case, if P(I) is greater than the minimum fraud probability threshold, the imposter account will be enrolled in the account verification process. If P(I) is less than the minimum fraud probability threshold, then the reporting user will be enrolled in the education process.

Figure 2B:
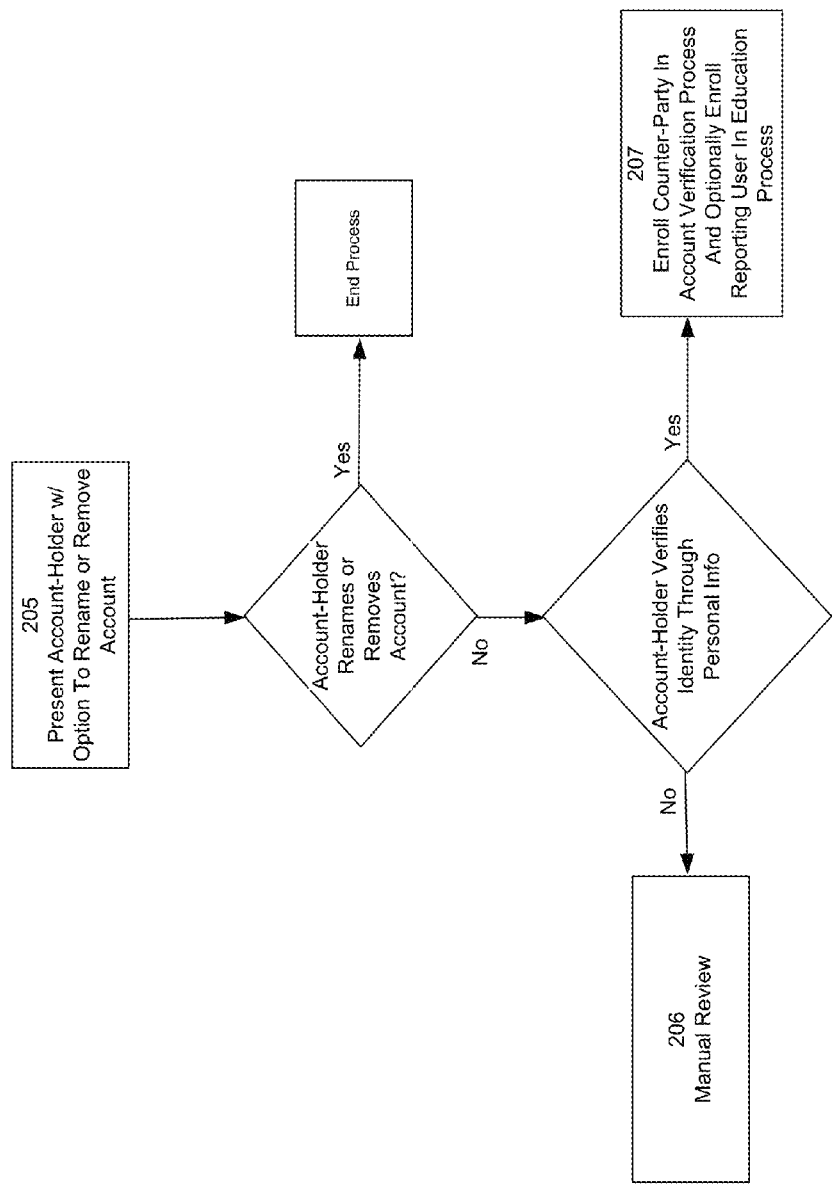
FIG. 2B is a flowchart illustrating one embodiment of an account verification process.

FIG. 2B illustrates one embodiment of the account verification process managed by the account verification manager 105 for verifying the authenticity of an account on the social networking system 101 held by an account-holder. The account verification manager, for example, can verify that an account with a profile that says "John Smith" is in fact controlled by an account-holder named John Smith. When the account verification manager 105 receives a request to verify the account of an account-holder, the account verification manager 105 may initially present 205 the account-holder with an option to rename or remove the account. This gives the account-holder the option to easily and gracefully end the process in a situation where the account-holder is aware they have created a fraudulent imposter account and is aware that they cannot verify their identity to the account verification manager 105. The option to rename or remove an account may be presented through a visual UI, such as a web page hosted by the social networking system 101, or it may be offered through a link in an email message, or through another interactive option. If the account-holder utilizes the option to rename or remove the account the account verification process is ended.

If the account-holder refuses to remove or rename the account, the account verification manager 105 may attempt to verify the account-holder's identity through an automated method. The automated methods of identification may include identification through a credit card, through a telephone number, through a third-party verification service, or through financial information such as from a bank. The account verification manager 105 may also request verification through real identification documents, for example, by requesting that the account-holder send a scan of their government issued ID (e.g. driver's license or passport). The account verification manager 105 may also utilize social verification or social CAPTCHA to verify the identity of the account-holder.

In social verification the account verification manager 105 queries the connections of the account-holder, and asks them to verify the account-holder's identity. The responses received from the account-holder's connections may be used to determine whether the account-holder is an imposter. For example, if an account holder claims to be a celebrity, that account-holder's friends may be polled by the account verification manager 105. If a majority of the account-holder's friends say that the account-holder is not the celebrity in question, the account verification manager 105 may determine that the account-holder is an imposter. To improve the accuracy of this process the responses received from the account-holder's connections may be weighted based on the fraud probabilities of those accounts. For example, a response from one of the account-holder's friends whose fraud probability is high may count for less than a response from a friend whose fraud probability is low.

In social CAPTCHA the account verification manager 105 presents the account-holder with questions that are generated using social data. These social questions are structured such that only an authentic user would have a high probability of getting them right. If the account-holder can successfully answer a sequence of such social questions the account verification manager 105 may determine that the user is authentic. One technique used for social CAPTCHA is presenting a user with a photo that includes people that the user is related to, and asking the user to identify those people by name.

Other methods for identity verification may also be used by the account verification manager 105. If the account verification manager 105 succeeds in authenticating the identity of the account-holder—i.e. the account-holder is who they say they are in their social networking account—the account verification manager 105 may enroll 207 the counter-party (i.e. the other account that claims the same identity) into the account verification process. For example, if the account-holder of the alleged imposter account succeeds in verifying her identity, then the alleged authentic account may be enrolled in the account verification process. If the account-holder of the alleged authentic account succeeds in verifying her identity, then it is the alleged imposter account that will be enrolled in the account verification process. If both accounts succeed in verifying their identities then the account verification manager 105 may escalate the verification process to a human reviewer for manual review. When the counter-party enrolled in the account verification process is the alleged authentic account identified by the reporting user, the reporting user themselves may be enrolled in an education process, described in more detail herein.

If the account-holder fails to verify their identity through the automated process, the account verification manager 105 may escalate the process to a human reviewer for manual review 206. In the manual review 206 the account verification manager 105 will queue the account for review by a human agent. If the human agent is able to verify the identity of the account-holder, they may also enroll the counter-party in the account verification process and enroll the reporting user in an education process, in a manner similar to when the account-holder's identity is verified automatically.

Figure 2C:
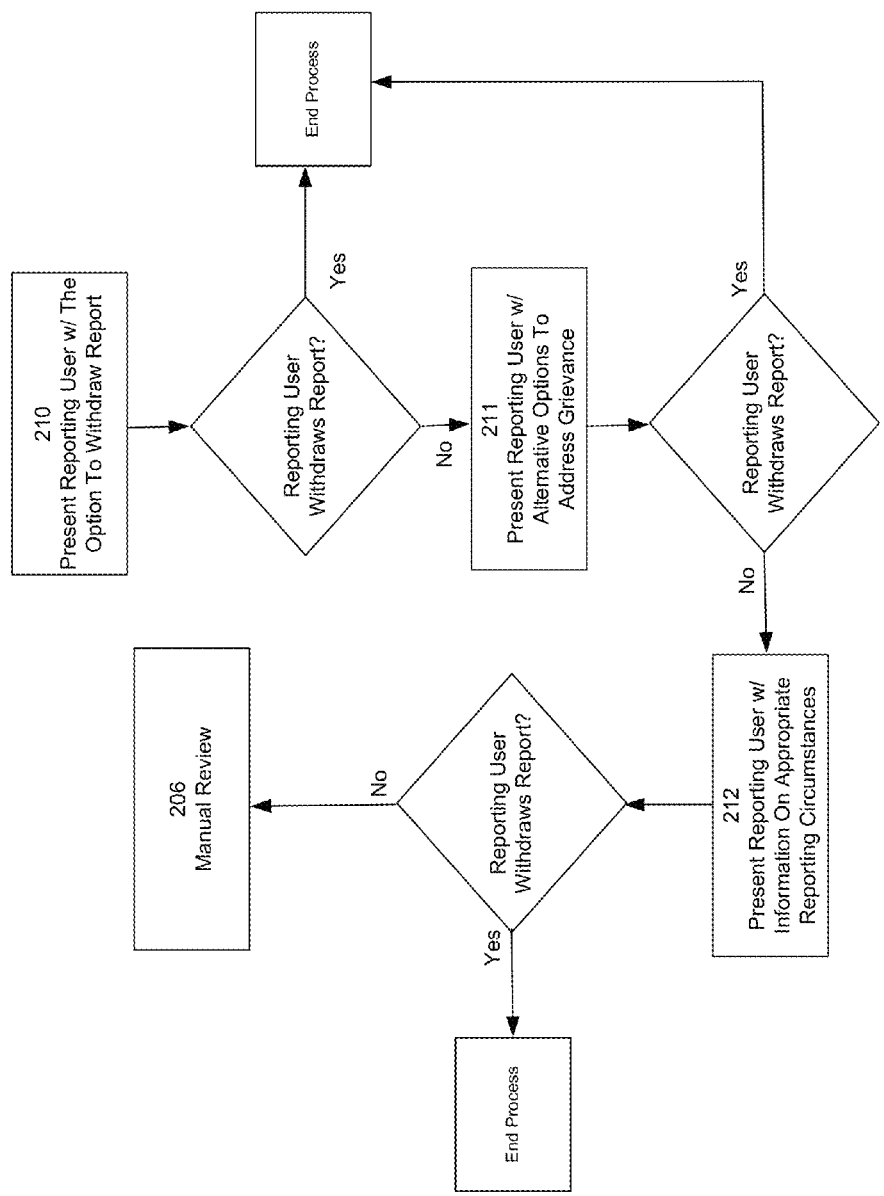
FIG. 2C is a flowchart illustrating one embodiment of an account education process.

FIG. 2C illustrates one embodiment of the account education process managed by the education manager 107, for educating reporting users to prevent improper imposter account reports. The education manager 107 initially presents 210 the reporting user with an option to withdraw their report. This gives the reporting user the option to end the education process if they already know that they are mistaken in their report. If the reporting user withdraws their report the education process ends. If the reporting user refuses to withdraw their report, the education manager 107 presents 211 the reporting user with alternative options to address the typical grievances that often spur improper reports in the social networking system 101. For example, the social networking system 101 may see a lot of improper reports from users that have been harassed by other users. In the case of harassment, a user may report another account-holder as retaliation for harassment suffered at their hands. In this case, the education manager 107 may present the reporting user with an alternative option to report harassment, so that they can withdraw their imposter account report. If the reporting user still refuses to withdraw their complaint, the education manager 107 will present 212 the reporting user with information on the appropriate circumstances for reporting an imposter account. This information may include details on what is and what is not an imposter account, for example. If the reporting user still refuses to withdraw the report, then the education manager will queue up the report for manual review 206 as described above.

The report manager 104 may be configured to prevent duplicate enrollments of accounts into the account verification process. If the report manager 104 detects that an account has recently been positively verified (i.e. the account-holder is who they say they are), then the report manager 104 may prevent that account from being re-enrolled in the account verification process.

Additional Concerns

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving a report from a reporting user of a social networking system, the report identifying an alleged imposter account in the social networking system;
calculating a first fraud probability measure based on social data, the first fraud probability measure comprising a measure of the probability that the alleged imposter account is fraudulent;
calculating a second fraud probability measure based on social data, the second fraud probability measure comprising a measure of the probability that an alleged authentic account is fraudulent;
comparing, by a processor, the first fraud probability measure to the second fraud probability measure; and
responsive to the first fraud probability measure being greater than the second fraud probability measure and greater than a minimum fraud probability threshold value, enrolling the alleged imposter account in an account verification process.

2. The method of claim 1, further comprising:
responsive to the second fraud probability measure being greater than the first fraud probability measure and greater than the minimum fraud probability threshold value, enrolling the alleged authentic account in an account verification process.

3. The method of claim 1, further comprising:
responsive to the first fraud probability measure and the second fraud probability measure being greater than the minimum fraud probability threshold value, enrolling both the alleged imposter account and the alleged authentic account in an account verification process.

4. The method of claim 1, wherein the account verification process further comprises verifying an account-holder's identity through collected financial information.

5. The method of claim 1, wherein the account verification process further comprises verifying an account-holder's identity through a telephone number.

6. The method of claim 1, wherein the account verification process further comprises verifying an account-holder's identity through social verification on the social networking system.

7. The method of claim 1, wherein the account verification process further comprises verifying an account-holder's identity through social Completely Automated Public Turing Test to Tell Computers and Humans Apart (CAPTCHA) on the social networking system.

8. The method of claim 1, further comprising:
responsive to the first fraud probability measure and the second fraud probability measure being less than the minimum fraud probability threshold value, enrolling the reporting user in an education process.

9. The method of claim 8, wherein the education process further comprises:
presenting the reporting user with alternative options to address a grievance;
presenting the reporting user with information on appropriate account reporting circumstances;
presenting the reporting user with an option to withdraw the report; and
responsive to the reporting user not withdrawing the report, queuing the report for manual review.

10. The method of claim 1, wherein the step of determining the first fraud probability measure, and the step of determining the second fraud probability measure further comprise, using a machine-learned algorithm to generate a fraud probability measure.

11. A method comprising:
receiving a report of an imposter account from a reporting user, the report comprising a reference to an alleged imposter account;

calculating a first fraud probability measure based on social data, the first fraud probability measure comprising a measure of the probability that the alleged imposter account is fraudulent;

calculating a second fraud probability measure based on the social data, the second fraud probability measure comprising a measure of the probability that an alleged authentic account is fraudulent;

comparing, by a processor, the first fraud probability measure and a minimum fraud probability threshold value;

comparing, the second fraud probability measure and the minimum fraud probability threshold value; and responsive to the first and second fraud probability measure being greater than the minimum fraud probability threshold value, enrolling the alleged imposter account and the alleged authentic account in an account verification process.

12. The method of claim 11, wherein the account verification process further comprises verifying an account-holder's identity through collected financial information.

13. The method of claim 11, wherein the account verification process further comprises verifying an account-holder's identity through a telephone number.

14. The method of claim 11, wherein the account verification process further comprises verifying an account-holder's identity through social verification on the social networking system.

15. The method of claim 11, wherein the account verification process further comprises verifying an account-holder's identity through social Completely Automated Public Turing Test to Tell Computers and Humans Apart (CAPTCHA) on the social networking system.

16. The method of claim 11, wherein the minimum fraud probability value is determined based on demographic information of the alleged imposter account.

17. The method of claim 11, wherein the minimum fraud probability value is determined based on demographic information of the reporting user.

18. The method of claim 11, further comprising:

responsive to the first fraud probability measure being less than the minimum fraud probability threshold value, enrolling the reporting user in an education process.

19. The method of claim 18, wherein the education process further comprises:

presenting the reporting user with alternative options to address a grievance;

presenting the reporting user with information on appropriate account reporting circumstances; and presenting the reporting user with an option to withdraw the report;

responsive to the reporting user not withdrawing the report, queuing the report for manual review.

20. The method of claim 11, wherein the step of determining a first fraud probability measure further comprises using a machine-learned algorithm to generate the fraud probability measure.

21. A non-transitory computer readable medium storing one or more programs, the one or more programs comprising instructions which when executed by a processor, cause the processor to perform a method comprising:

receiving a report from a reporting user of a social networking system, the report identifying an alleged imposter account in the social networking system;

calculating a first fraud probability measure based on social data, the first fraud probability measure comprising a measure of the probability that the alleged imposter account is fraudulent;

calculating a second fraud probability measure based on social data, the second fraud probability measure comprising a measure of the probability that an alleged authentic account is fraudulent;

comparing, by a processor, the first fraud probability measure to the second fraud probability measure; and responsive to the first fraud probability measure being greater than the second fraud probability measure and greater than a minimum fraud probability threshold value, enrolling the alleged imposter account in an account verification process.

22. The computer readable medium of claim 21, wherein the account verification process further comprises verifying an account-holder's identity through a telephone number.

23. The computer readable medium of claim 21, wherein the account verification process further comprises verifying an account-holder's identity through social Completely Automated Public Turing Test to Tell Computers and Humans Apart (CAPTCHA) on the social networking system.

24. The computer readable medium of claim 21, further comprising instructions that cause the processor to perform:

responsive to the first fraud probability measure and the second fraud probability measure being less than the minimum fraud probability threshold value, enrolling the reporting user in an education process.

25. The computer readable medium of claim 21, wherein the step of determining the first fraud probability measure, and the step of determining the second fraud probability measure further comprise, using a machine-learned algorithm to generate a fraud probability measure.

26. A non-transitory computer readable medium storing one or more programs, the one or more programs comprising instructions which when executed by a processor, cause the processor to perform a method comprising:

receiving a report of an imposter account from a reporting user, the report comprising a reference to an alleged imposter account;

calculating a first fraud probability measure based on social data, the first fraud probability measure comprising a measure of the probability that the alleged imposter account is fraudulent;

calculating a second fraud probability measure based on the social data, the second fraud probability measure comprising a measure of the probability that an alleged authentic account is fraudulent;

comparing, by a processor, the first fraud probability measure and a minimum fraud probability threshold value;

comparing, the second fraud probability measure and the minimum fraud probability threshold value; and responsive to the first and second fraud probability measure being greater than the minimum fraud probability threshold value, enrolling the alleged imposter account and the alleged authentic account in an account verification process.

27. The computer readable medium of claim 26, wherein the account verification process further comprises verifying an account-holder's identity through a telephone number.

28. The computer readable medium of claim 26, wherein the account verification process further comprises verifying an account-holder's identity through social Completely Automated Public Turing Test to Tell Computers and Humans Apart (CAPTCHA) on the social networking system.

* * * * *